350-167 SR

4/4/78 XR 4,082,451

United States Patent [19]

Patel

[11] 4,082,451

[45] Apr. 4, 1978

[54] COMPACT ILLUMINATION SYSTEM FOR OPTICALLY PROVIDING A STRUCTURED PHOTORECEPTOR CHARGE DISTRIBUTION

[75] Inventor: Vinod Patel, Rochester, N.Y.

[73] Assignee: Xerox Corporation, Stamford, Conn.

[21] Appl. No.: 634,017

[22] Filed: Nov. 21, 1975

[51] Int. Cl.[2] .......... G03B 27/76

[52] U.S. Cl. .......... 355/71; 350/167; 355/3 R

[58] Field of Search .......... 355/3 R, 1, 8, 71, 69; 354/115; 350/167, 188, 190, 205, 206, 241

[56] References Cited

U.S. PATENT DOCUMENTS

| | | | |
|---|---|---|---|
| 3,178,993 | 4/1965 | Ferris et al. | 350/167 |
| 3,785,262 | 1/1974 | Stroke | 354/100 X |

*Primary Examiner*—Fred L. Braun

[57] ABSTRACT

Apparatus for providing a structured radiation pattern in a charge distribution of a photoreceptor. The apparatus is comprised of a source of radiation, a plurality of apertures and a lens system for focusing the illumination, by the apertures, on the photoreceptor. The lens system is arranged to provide an overlapping of the aperture images formed on the photoreceptor. The overlapping images minimize the requirement on the intensity of radiation from the radiation source. The position of the apparatus from the photoreceptor provides a method for control of the size of the structured pattern on the photoreceptor charge. A line structure or a dot structure pattern can be applied to the charge distribution of the photoreceptor.

7 Claims, 5 Drawing Figures

COMPACT ILLUMINATION SYSTEM FOR OPTICALLY PROVIDING A STRUCTURED PHOTORECEPTOR CHARGE DISTRIBUTION

This invention relates generally to electrostatographic reproduction of an image and more particularly to apparatus for improved electrostatographic image reproduction whereby a charge distribution with microstructure provides a latent electrostatic image stored on the photoreceptor with structure. The charge structure permits improved development of latent electrostatic image.

It is known in the art of electrostatographic image reproduction that improved reproduction can be provided by a charge distribution on a photoreceptor with a structure. The structured charge distribution is known, along with appropriate development techniques, to provide an extended development range and can improve solid area or halftone image reproduction.

It is known in the prior art to provide the charge distribution on the photoreceptor with structure by placing a screen, either before the image to be reproduced or before the photoreceptor itself thereby interrupting the image radiation impinging on the photoreceptor and providing the latent electrostatic image formed in the photoreceptor with microstructure.

It is further known in the prior art that the charge distribution on a photoreceptor can be changed by application of radiation thereto. Indeed the formation of the latent electrostatic image is a result of this phenomenon. Thus, by appropriately structured radiation impinging on the photoreceptor, the photoreceptor charge distribution can be provided with structure.

The space available for providing an illuminating apparatus is frequently limited. The space limitation is further complicated by the general requirement that the apparatus should be sufficiently removed from the photoreceptor to minimize the possibility of contact between the photoreceptor and the illumination source to reduce the potential for damage to the photoreceptor surface.

It is therefore an object of the present invention to provide apparatus used in conjunction with an electrostatographic image reproduction machine to improve image reproduction.

It is a further object of the present invention to provide a light source to form an image pattern or a charge distribution on a photoreceptor.

It is yet another object of the present invention to provide a compact illumination source capable of applying a radiation pattern to the surface of photoreceptor.

It is a more particular object of the present invention to provide a light source, an aperture screen and a compact lens system for forming a radiation pattern, the radiation pattern comprised of overlapping aperture images on a photoreceptor of an electrostatographic machine.

It is a still further object of the present invention to provide more efficient utilization of a radiation source discharging stored photoreceptor electrostatic charge.

It is yet another object of the present invention to provide an illumination source exhibiting a radiation pattern including overlapping aperture images.

The aforementioned and other objects are accomplished by the present invention by a compact illumination source including a source of optical radiation, a screen for selectively transmitting portions of the optical radiation and a lens system for focusing the transmitted radiation portions. The lens system can be a fly's eye type lens system, strip lens system or other compact lens system. The lens system is adapted to provide a radiation pattern on the photoreceptor surface in which pattern components can be illuminated by a plurality of radiation transmitting apertures. The illumination source can be activated continuously, thereby providing a line pattern of the charge distribution on the moving photoreceptor, or by periodically activating the illumination source on the moving photoreceptor a pattern comprised substantially of a dot pattern can be formed for the photoreceptor charge distribution.

These and other features of the present invention will be understood upon reading of the following specification along with the Figures of which:

Figure 1:
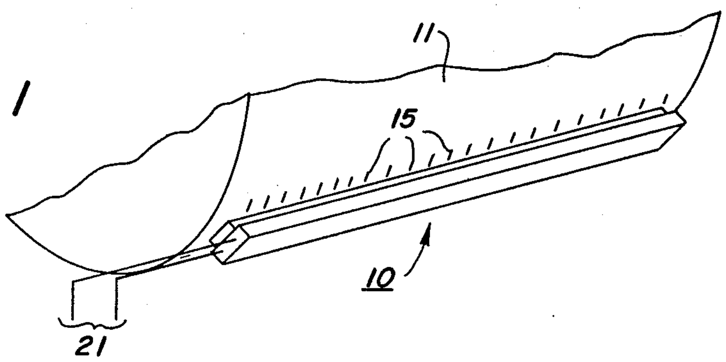
FIG. 1 is schematic diagram of the relation of the compact optical source to the photoreceptor surface.

Referring now to FIG. 1, the relation of the compact illumination source 10 to the photoreceptor surface 11 in an electrostatographic reproduction machine is shown. The source 10 is secured in a position relative to the moving photoreceptor surface 11 (by means not shown) so that radiation 15 is applied to the surface 11 in a preselected pattern. Leads 21 provide power to activate a source of radiation forming part of the compact illumination source.

Figure 2:
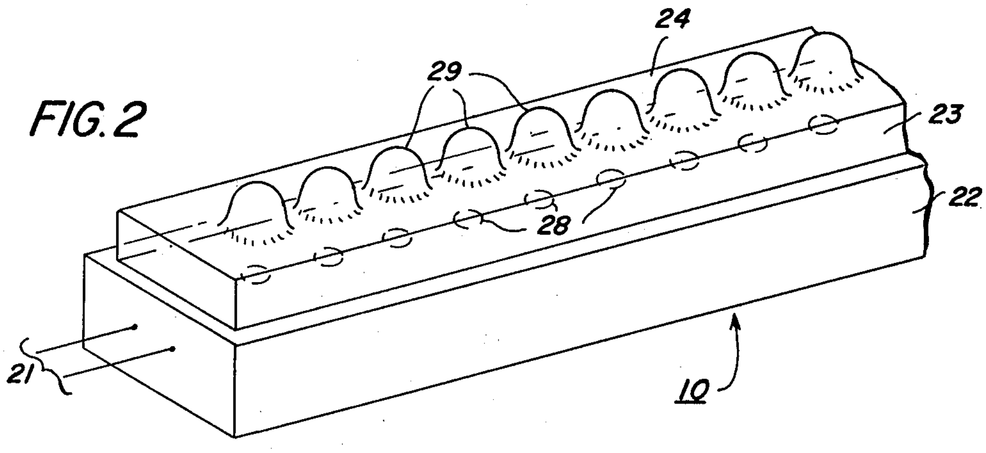
FIG. 2 is a schematic view of the illumination source according to the preferred embodiment.

Referring next to FIG. 2, a schematic representation of the compact illumination source 10 is shown. Source 10 includes a source of radiation 22 with the surface of the radiation source 22 exposed to the photoreceptor surface not optically enclosed. Over the exposed portion of the radiation source 22 is positioned an optical stop 23 with a plurality of apertures 28. In the vicinity of stop 23, a lens system 24 is positioned. The lens system 24 has included therewith a plurality of lenses or lenselets 29. In the preferred embodiment the lenses 29 and the supporting material are fabricated from a single material reducing scattering which can occur at optical interfaces.

Figure 3:
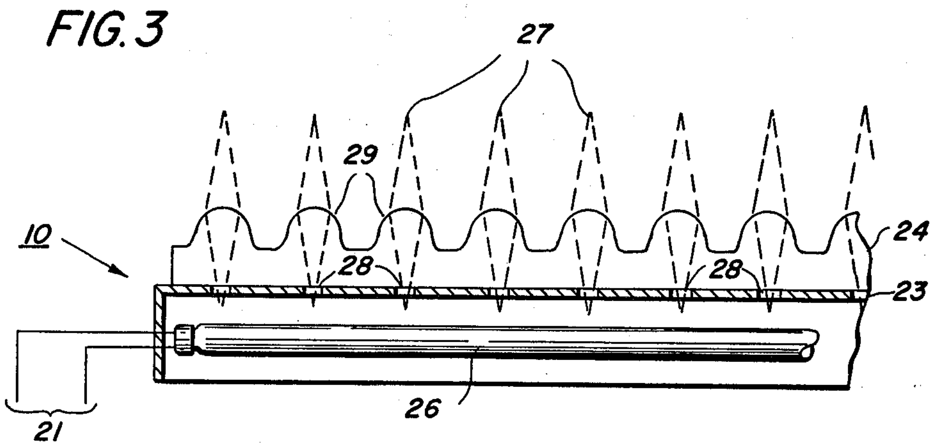
FIG. 3 is a schematic cross-sectional view of the illumination source according to the preferred embodiment.
Figure 5:
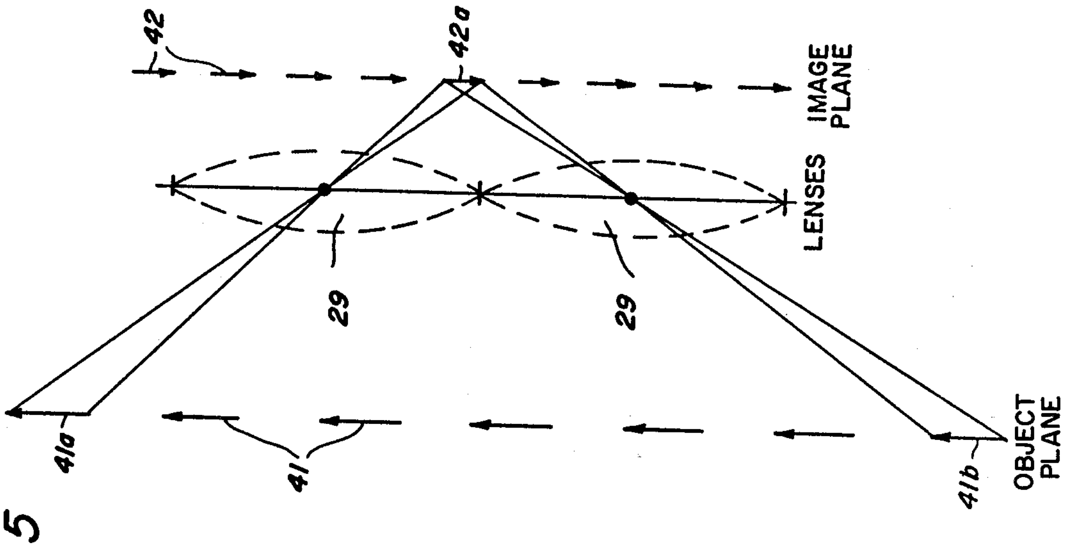
FIG. 4 and FIG. 5 are schematic diagrams illustrating lens configurations for achieving multiple illumination of radiation pattern components on a photoreceptor surface.

Referring next to FIG. 3, the cross-sectional view of source 10, the lenses 29 are shown positioned relative to apertures 28 in such a manner that the apertures can be focused. The focusing of the image of aperture 28 (i.e. the radiation originating at radiation source 26 and transmitted through the apertures) is indicated by the dotted lines 27. At one distance between the photoreceptor and the source 10, the focused aperture image magnitudes will be the minimum. By varying the distance between the source 10 and the photoreceptor surface 11, the size of the aperture image can be varied and can provide a control of the size of the pattern.

Figure 4:
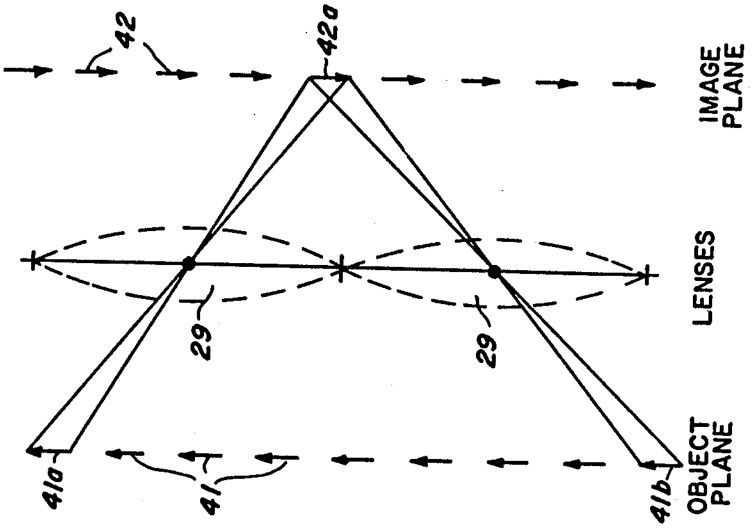

Referring now to FIG. 4, a lens system having four apertures 41 per lens 29 is shown. The lenses 29 have a one-to-one magnification from the object plane to the image plane. Regions of illumination 42 can be illuminated by a plurality of apertures 41. For example, **42*a* is illuminated by both aperture 41*a* and aperture 41*b***. FIG.

5 illustrates a similar embodiment of multiple region illumination by a plurality of apertures differing however from the embodiment of FIG. 4 in the integral number of apertures associated with each lens and in the magnification between the object plane and the image plane.

The radiation from the compact optical source 10 applied to the charged photoreceptor surface provides by local distribution of charge in the region whereon the radiation is focused, a local pattern of charge. This pattern of charge is analogous to the charge pattern determined by screens used to provide range extension in electrostatographic reproduction systems. The reproduction of halftones and solid areas can be enhanced with screening techniques. Furthermore, as will be clear to those skilled in the art, the charge pattern from the illumination source 10, can be applied to the charged photoreceptor surface before or after the formation of the latent image. Furthermore, it will be clear to those skilled in the art that, by constant activation of the illumination source 10, a line pattern can be formed in the photoreceptor charge distribution, the photoreceptor typically being in motion. By pulsing the radiation source 26, a dot pattern can be formed in the photoreceptor charge distribution.

While the preferred embodiment illustrated in FIG. 2 includes a single row of lenses, it will be clear that an array of lenses can be employed without departing from the invention. Furthermore, the lenses 29 of FIG. 3 can be replaced by portions of cylindrical lenses formed in system 24, and the apertures 28 can become slits, the slits and the cylindrical lenses being parallel and positioned relative to each other to focus the slit on the photoreceptor surface.

It is further clear that by defocusing the aperture images on the photoreceptor surface, for example, by changing the distance between the illumination source and the photoreceptor surface, a charge distribution analogous to the distribution in which a partially absorbing screen is utilized to provide range extension. For each pattern component imaged on the photoreceptor surface, a distribution of charge can be achieved and improved image development can be obtained.

The above description is included to illustrate the operation of the preferred embodiment and is not meant to limit the scope of the invention. The scope of the invention is limited only by the following claims. A person skilled in the art can readily discern changes and variation in the above description which are yet within the spirit and scope of the invention.

What is claimed is:

1. A system for applying a structured radiation pattern to a charged photoreceptor surface in an electrostatographic reproduction apparatus, including:

an extended source of radiation, an apertured opaque material extending along said source between said source and said photoreceptor surface, said opaque material defining a plurality of apertures therealong, a lenticular strip member extending along said source between said opaque material and said photoreceptor surface, said source, said opaque material, and said lenticular strip together forming an integral pattern projector, said lenticular strip including a plurality of lenselets for imaging said plurality of apertures on said photoreceptor surface to create therein a dot pattern corresponding to said plurality of apertures, said apertured opaque material defining a plurality of said apertures to correspond with each of said lenselets.

2. A system as defined in claim 1 in which said photoreceptor surface is movably disposed relative to said pattern projector, whereby the charge pattern imparted to said photoreceptor is a plurality of spaced lines.

3. A system as defined in claim 2 in which said source of radiation is pulsed on and off while said photoreceptor moves so that the resulting charge patterns on said photoreceptor is a dot pattern.

4. A system for applying a structured radiation pattern to a charged photoreceptor surface in an electrostatographic reproduction apparatus, including:

an extended source of radiation;

an apertured opaque material extending along said source between said source and said photoreceptor surface, said opaque material defining a plurality of apertures therealong, a lenticular strip member extending along said source between said opaque material and said photoreceptor surface, said source, said opaque material, and said lenticular strip together forming an integral pattern projector, said lenticular strip including a plurality of lenselets for imaging said plurality of apertures on said photoreceptor surface to create therein a dot pattern corresponding to said plurality of apertures, said apertured opaque material defining a plurality of said apertures to correspond with each of said lenselets, said apertured opaque material and said photoreceptor surface being at unequal distances from said lenticular strip and said lenselets so that the images of said apertures are projected at other than unity magnification.

5. A system for applying a structured radiation pattern to a charged photoreceptor surface in an electrostatographic reproduction apparatus, including:

an extended source of radiation;

a stop member extending along said source between said source and said photoreceptor surface, said stop member defining a plurality of apertures therealong;

a lenticular strip member extending along said stop member between said stop member and said photoreceptor surface, said lenticular strip member including a plurality of lenselets;

said stop member and said photoreceptor surface being in object and image conjugate relationship with respect to said lenslets, there being a plurality of apertures in object-image correspondence to each of said lenselets;

whereby said apertures are imaged at said photoreceptor surface to create thereon an image pattern corresponding to said plurality of apertures.

6. A system as defined in claim 5 in which said photoreceptor surface is movably disposed relative to said stop member and said lenticular strip member, whereby the image pattern imparted to said photoreceptor surface is a plurality of spaced lines.

7. A system as defined in claim 6 in which said source of radiation is pulsed on and off while said photoreceptor moves so that the resulting image pattern on said photoreceptor is a dot pattern.

* * * * *